United States Patent
Zhang et al.

(10) Patent No.: US 12,073,671 B2
(45) Date of Patent: Aug. 27, 2024

(54) ULTRAWIDEBAND RANGE ACCURACY

(71) Applicant: QUALCOMM Incorporated, San Diego, CA (US)

(72) Inventors: Xiaoxin Zhang, Sunnyvale, CA (US); Le Nguyen Luong, San Diego, CA (US); Liang Zhao, Saratoga, CA (US); Rishabh Raj, Jamshedpur (IN); Ravindra Chauhan, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 17/470,061

(22) Filed: Sep. 9, 2021

(65) Prior Publication Data
US 2023/0071554 A1    Mar. 9, 2023

(51) Int. Cl.
*G07C 9/00* (2020.01)
*H04W 76/16* (2018.01)

(52) U.S. Cl.
CPC ........ *G07C 9/00309* (2013.01); *H04W 76/16* (2018.02); *G07C 2009/00357* (2013.01)

(58) Field of Classification Search
CPC ..... G07C 9/00309; G07C 2009/00357; H04W 76/16; H04W 4/40; B60R 25/245; B60R 2325/205
See application file for complete search history.

(56) References Cited

U.S. PATENT DOCUMENTS

| 9,140,772 | B1* | 9/2015 | Dewberry | G01S 3/04 |
| 2008/0267150 | A1* | 10/2008 | Rofougaran | G01S 19/49 |
| | | | | 342/357.32 |
| 2012/0149390 | A1* | 6/2012 | Gravely | G01S 5/14 |
| | | | | 455/456.1 |
| 2018/0035322 | A1* | 2/2018 | Yamine | H04W 24/10 |
| 2018/0099643 | A1 | 4/2018 | Golsch et al. | |
| 2020/0100195 | A1* | 3/2020 | Khati | H04W 52/146 |
| 2020/0259522 | A1 | 8/2020 | Hammerschmidt et al. | |
| 2022/0146656 | A1 | 5/2022 | Fujii | |
| 2022/0314934 | A1* | 10/2022 | Smith | H04B 17/27 |

OTHER PUBLICATIONS

International Search Report and Written Opinion—PCT/US2022/036507—ISA/EPO—Oct. 19, 2022.

* cited by examiner

*Primary Examiner* — Vernal U Brown
(74) *Attorney, Agent, or Firm* — Thien T. Nguyen

(57) ABSTRACT

Techniques are provided for improving ranging accuracy of ultrawideband (UWB) devices. An example method for obtaining a distance measurement with a wireless node includes obtaining a first distance measurement using a first radio link, determining a status of a second radio link in response to the first distance measurement being less than a threshold distance, configuring one or more transceiver parameters associated with the second radio link in response to determining the second radio link is utilizing a non-line of sight path, and obtaining a second distance measurement using the second radio link and the one or more transceiver parameters.

27 Claims, 14 Drawing Sheets

ULTRAWIDEBAND RANGE ACCURACY

BACKGROUND

The use of wireless devices for many everyday activities is becoming common. Modern wireless devices may make use of one or more wireless communication technologies. For example, a wireless device may communicate using a short range communication technology such as Bluetooth technology, ultrawideband (UWB) technology, millimeter wave (mmWave) technology, etc. The use of short range communication technologies, such as Bluetooth, in wireless devices has become much more common in the last several years and is regularly used in retail businesses, offices, homes, cars, and public gathering places. The larger bandwidth of UWB devices may be beneficial for ranging protocols used in high security applications such as digital keys. The range accuracy associated with UWB devices may degrade in some use cases such as at long range or when the line of sight between the UWB devices is obstructed. There is a need to improve the ranging accuracy for UWB devices to support multiple use cases.

SUMMARY

An example method for obtaining a distance measurement with a wireless node according to the disclosure includes obtaining a first distance measurement using a first radio link, determining a status of a second radio link in response to the first distance measurement being less than a threshold distance, configuring one or more transceiver parameters associated with the second radio link in response to determining the second radio link is utilizing a non-line of sight path, and obtaining a second distance measurement using the second radio link and the one or more transceiver parameters.

Implementations of such a method may include one or more of the following features. The first radio link may be a Bluetooth based technology. The first radio link may be a WiFi based technology. The second radio link may be a ultrawideband technology. The threshold distance may be 100 meters or less. Determining that the second radio link is utilizing the non-line of sight path may include receiving a plurality of radio frequency signals on the first radio link or the second radio link, and detecting the non-line of sight path based on the plurality of radio frequency signals. The method may further include determining a first range value based on a round trip time associated with the plurality of radio frequency signals, determining a second range value based on a received signal strength indication associated with the plurality of radio frequency signals, and detecting the non-line of sight path based at least in part on a comparison of the first range value and the second range value. Determining a channel state indication based on at least one of the plurality of radio frequency signals, and detecting the non-line of sight path based at least in part on the channel state indication. Determining a time-of-flight variance value associated with the plurality of radio frequency signals, and detecting the non-line of sight path based at least in part on the time-of-flight variance value. Comparing one or more signal measurement values obtained via the second radio link to a key performance indicator value, and configuring the one or more transceiver parameters based at least in part on a difference between the one or more signal measurement values and the key performance indicator value. Configuring the one or more transceiver parameters may include increasing a transmit output power. Configuring the one or more transceiver parameters may include decreasing a transmit packet length. Configuring the one or more transceiver parameters may include modifying a receiver antenna configuration. The wireless node may be a user equipment. The user equipment may be a digital key fob. The wireless node may be a controller in a vehicle.

An apparatus according to the disclosure includes a memory, at least one transceiver, at least one processor communicatively coupled to the memory and the at least one transceiver, and configured to obtain a first distance measurement using a first radio link, determine a status of a second radio link in response to the first distance measurement being less than a threshold distance, configure one or more transceiver parameters associated with the second radio link in response to determining the second radio link is utilizing a non-line of sight path, and obtain a second distance measurement using the second radio link and the one or more transceiver parameters.

Implementations of such an apparatus may include one or more of the following features. The at least one transceiver may include a Bluetooth module and the first radio link may be a Bluetooth based technology. The at least one transceiver may include a WiFi module and the first radio link may be a WiFi based technology. The at least one transceiver may include an ultrawideband module and the second radio link may be a ultrawideband technology. The threshold distance may be 100 meters or less. The at least one processor may be further configured to receive a plurality of radio frequency signals on the first radio link or the second radio link, and detect the non-line of sight path based on the plurality of radio frequency signals. The at least one processor may be further configured to determine a first range value based on a round trip time associated with the plurality of radio frequency signals, determine a second range value based on a received signal strength indication associated with the plurality of radio frequency signals, and detect the non-line of sight path based at least in part on a comparison of the first range value and the second range value. The at least one processor may be further configured to determine a channel state indication based on the plurality of radio frequency signals, and detect the non-line of sight path based at least in part on the channel state indication. The at least one processor may be further configured to determine a time-of-flight variance value associated with the plurality of radio frequency signals, and detect the non-line of sight path based at least in part on the time-of-flight variance value. The at least one processor may be further configured to compare one or more signal measurement values obtained via the second radio link to a key performance indicator value, and configure the one or more transceiver parameters based at least in part on a difference between the one or more signal measurement values and the key performance indicator value. The at least one processor may be further configured to increase a transmit power to configure the one or more transceiver parameters. The at least one processor may be further configured to decrease a transmit packet length to configure the one or more transceiver parameters. The at least one processor may be further configured to modify a receiver antenna configuration to configure the one or more transceiver parameters.

Items and/or techniques described herein may provide one or more of the following capabilities, as well as other capabilities not mentioned. Two wireless nodes may be configured to transmit and receive range measurements using different radio links. An initial range may be established using a first radio link such as Bluetooth or WiFi. A subsequent range may be measured using a second radio link when the wireless nodes are within range of the second radio link. The second radio link may be an ultrawideband (UWB) radio link. A non-line of sight (NLOS) condition may be detected based on signals received on the first or second radio links. Transmitter parameters on the second radio link may be modified based on the detection of the NLOS condition. Transmit power and/or transmit signal profiles (e.g., packet lengths) may be modified to improve the measurement results. Receiver antenna configurations may also be modified. The transceiver parameter modifications may improve the accuracy of UWB based positioning. The parameter modification may be implemented based on a desired key performance indicator. Limiting UWB signals to short range measurements may conserve battery power. Other capabilities may be provided and not every implementation according to the disclosure must provide any, let alone all, of the capabilities discussed.

DETAILED DESCRIPTION

Techniques are discussed herein for improving ranging accuracy of ultrawideband (UWB) devices. A short-range communication technology such as Bluetooth technology (BLE), UWB, or millimeter wave (mmWave) may be used for ranging applications such as digital keys and consumer asset tracking. Bluetooth technology (BLE) may also be referred to as Bluetooth low energy technology. UWB may be used for secure ranging protocols which require decimeter-level ranging accuracy as well as high security. UWB devices, with approximately 500 MHz bandwidth, may achieve decimeter-level ranging accuracy in line of sight (LOS) conditions. The low transmit power of UWB systems, however, may cause a degradation of ranging performance in non-line of sight (NLOS) conditions. For example, the accuracy of a UWB digital key may drop to half-meter accuracy due to NLOS conditions such as blocking a signal with a human body, or when the digital key is located in a closed environment such as a backpack or purse. The techniques provided herein reduce ranging fluctuations associated with UWB ranging in NLOS conditions.

A UWB capable wireless device may be configured to execute a multi-level adaptation algorithm to detect NLOS conditions and then configure one or more transceiver parameters such as transmit (Tx) power, packet length, idle time and number of receive (Rx) antennas to improve UWB ranging accuracy. In an example, the algorithm may be triggered when both a short range condition and a NLOS condition are detected. Existing algorithms may be used to determine the short range and NLOS conditions. For example, time-of-flight (ToF) measurements such as obtained with round trip time (RTT) procedures, and signal strength measurements (e.g., radio signal strength indication (RSSI) values) may be used to determine an initial range and detect a NLOS condition. Channel State Information (CSI) and ToF variations may also be used to detect NLOS conditions. In an example, a UWB ranging systems may be triggered by BLE range measurements such that UWB ranging occurs when the BLE range measurements indicate a close range. In an example, Wi-Fi range measurements may be used to detect an initial range to trigger UWB ranging. The multi-level adaptation algorithm may utilize input from other ranging techniques to modify the transceiver parameters associated with the UWB ranging. These techniques and configurations are examples, and other techniques and configurations may be used.

Figure 1:
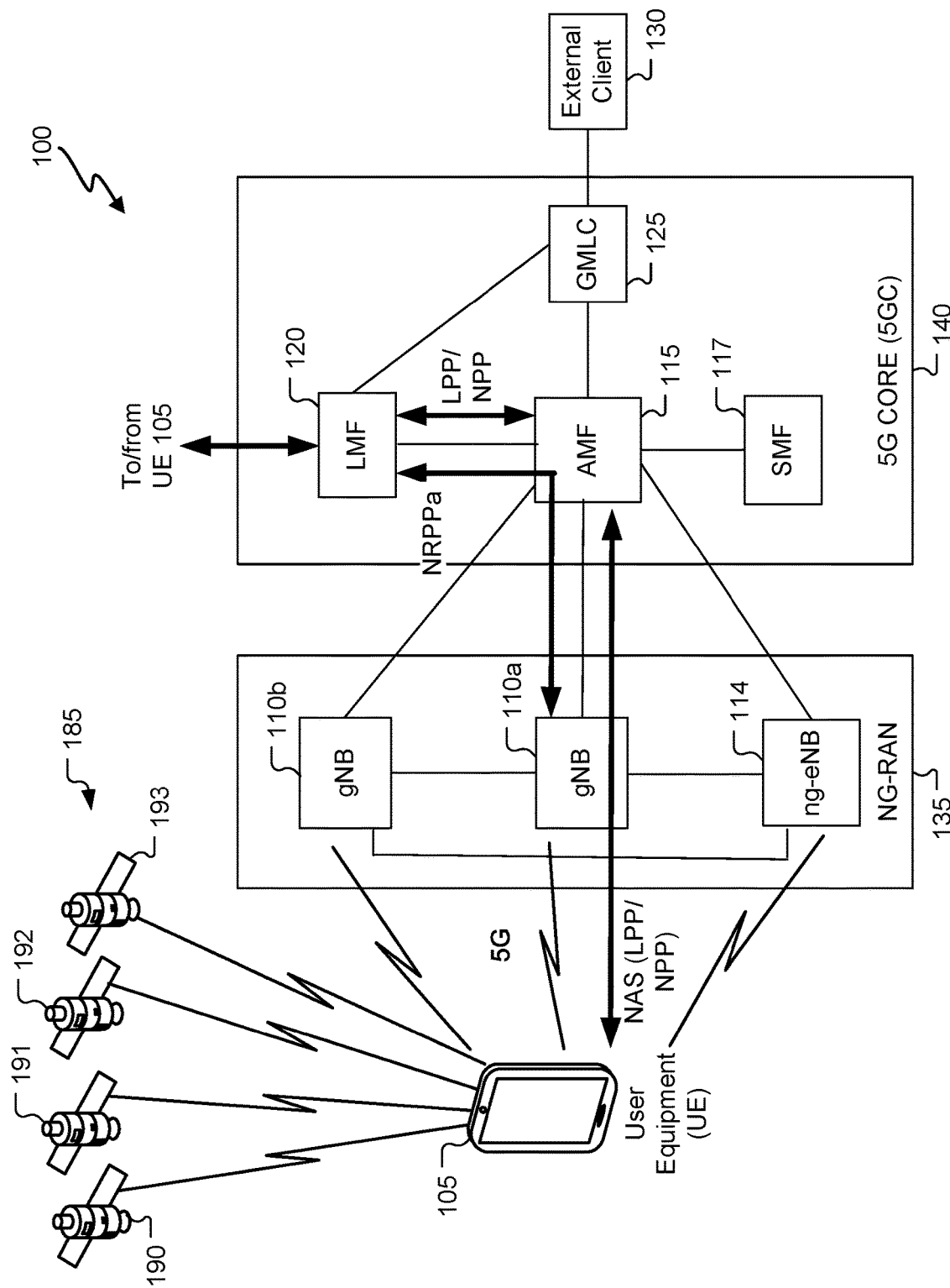
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a consumer asset tracker device, a cellular telephone, digital key (e.g., key fob), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, navigation device, Internet of Things (IoT) device, asset tracker, health monitors, security systems, smart city sensors, smart meters, digital key, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, 5G CV2X Sidelink, 5G ProSe, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs, such as the gNB 110a, gNB 110b, ng-eNB 114 may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
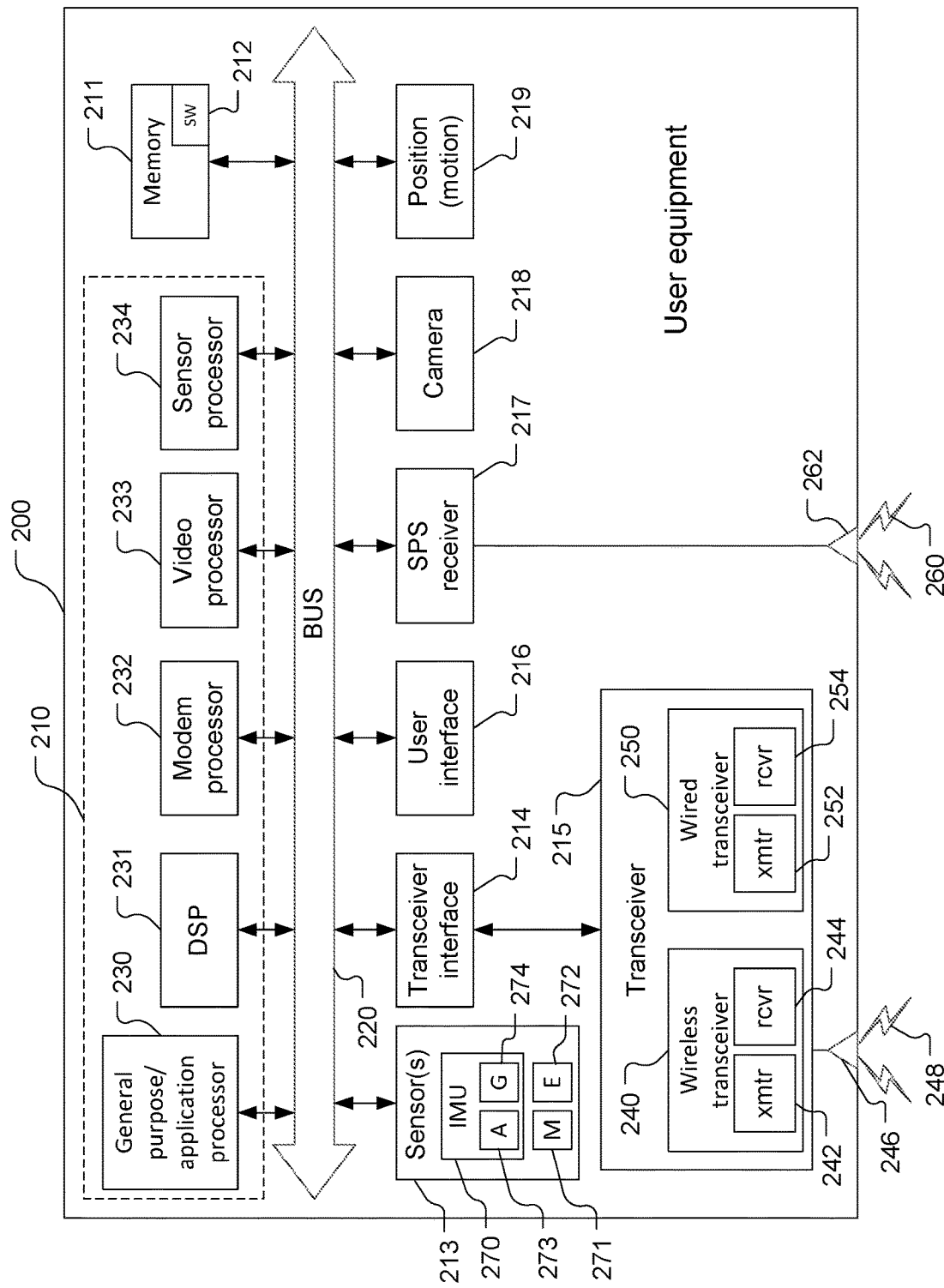
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sending (with one or more wireless signals transmitted and reflections used to identify, map and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations. The sensors processing subsystem may be embedded in a low power core that facilitates continuous logging and derivation of sensor parameters required for high level functions such as temperature sensing, location assist or dead reckoning.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to determine a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (Vehicle-to-Everything) (PC5), V2C (Uu), IEEE 802.11 (including IEEE 802.11p), WiFi, WiFi Direct (WiFi-D), Bluetooth®, Zigbee, 5G CV2X (Sidelink), 5G ProSe, etc. New Radio may use mm-wave frequencies and/or sub-6 GHz frequencies. The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
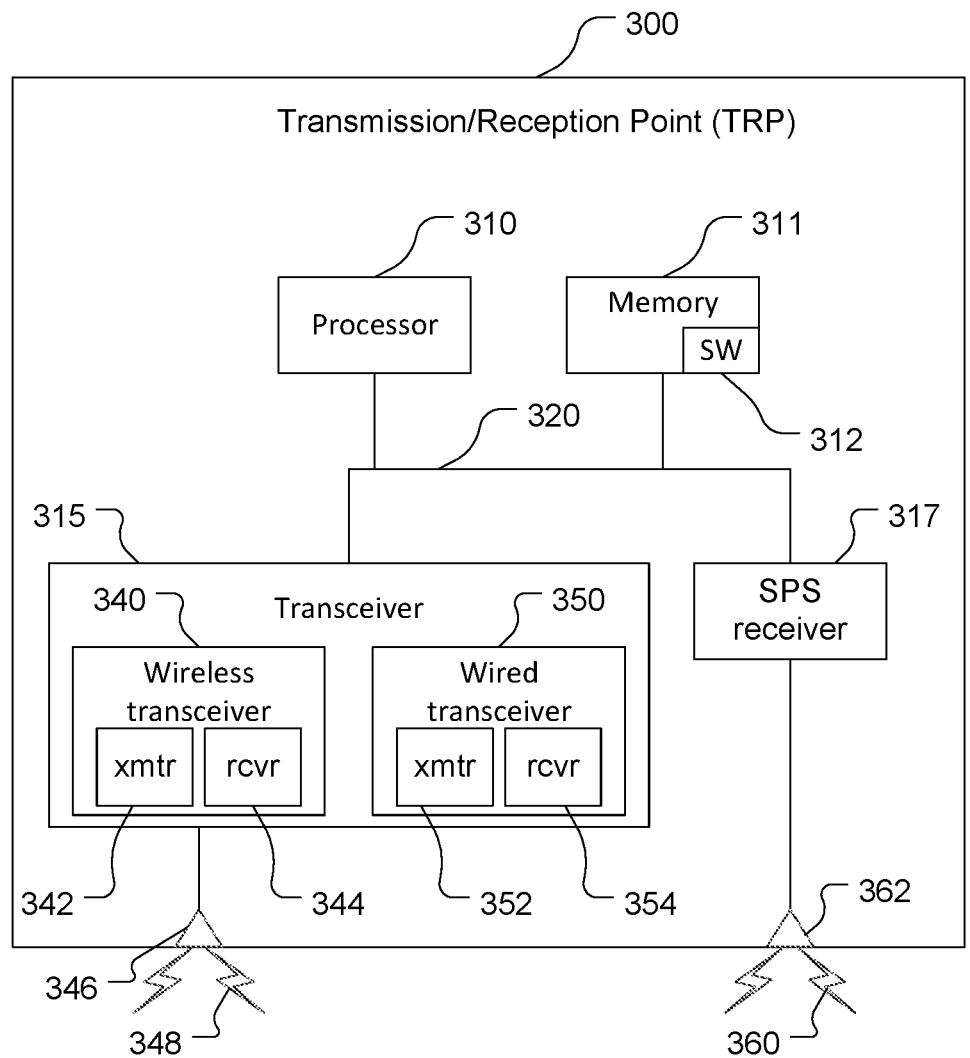
FIG. 3 is a block diagram of components of an example transmission/reception point.

Referring also to FIG. 3, an example of a TRP 300 of the gNB 110a, gNB 110b, ng-eNB 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), 802.15, Bluetooth®, Zigbee, UWB, mmWave, etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
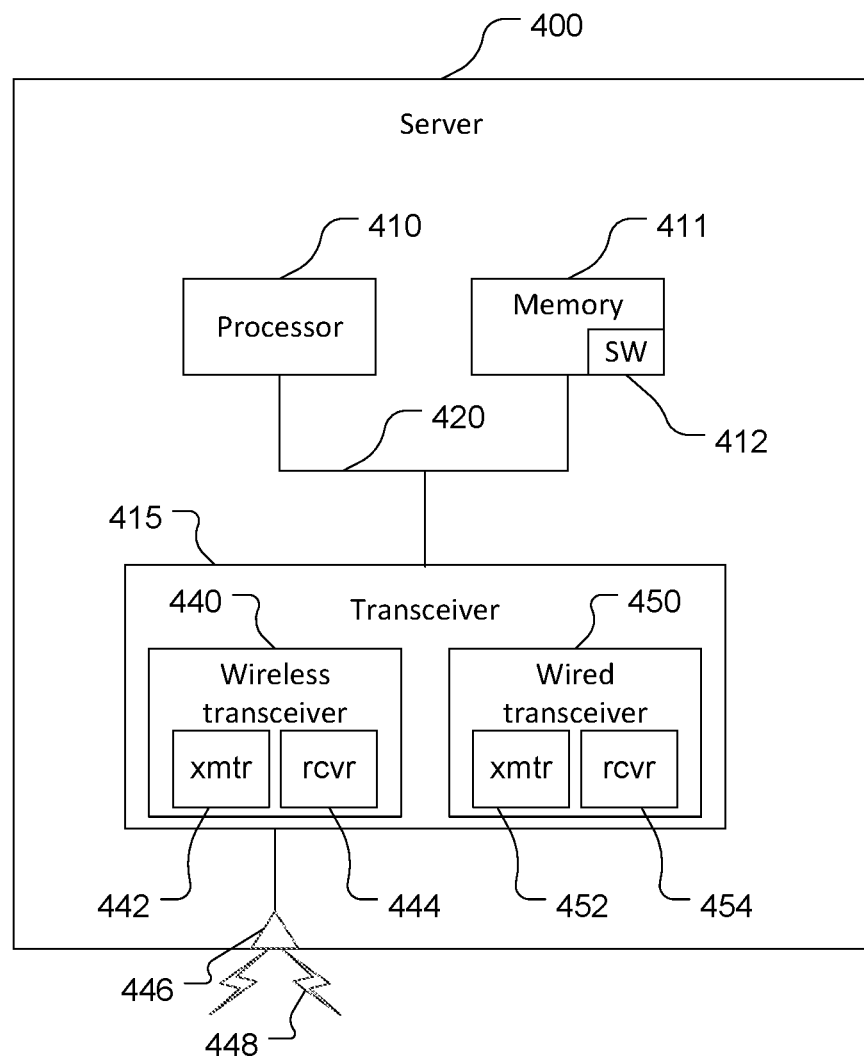
FIG. 4 is a block diagram of components of an example server.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, BLE, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
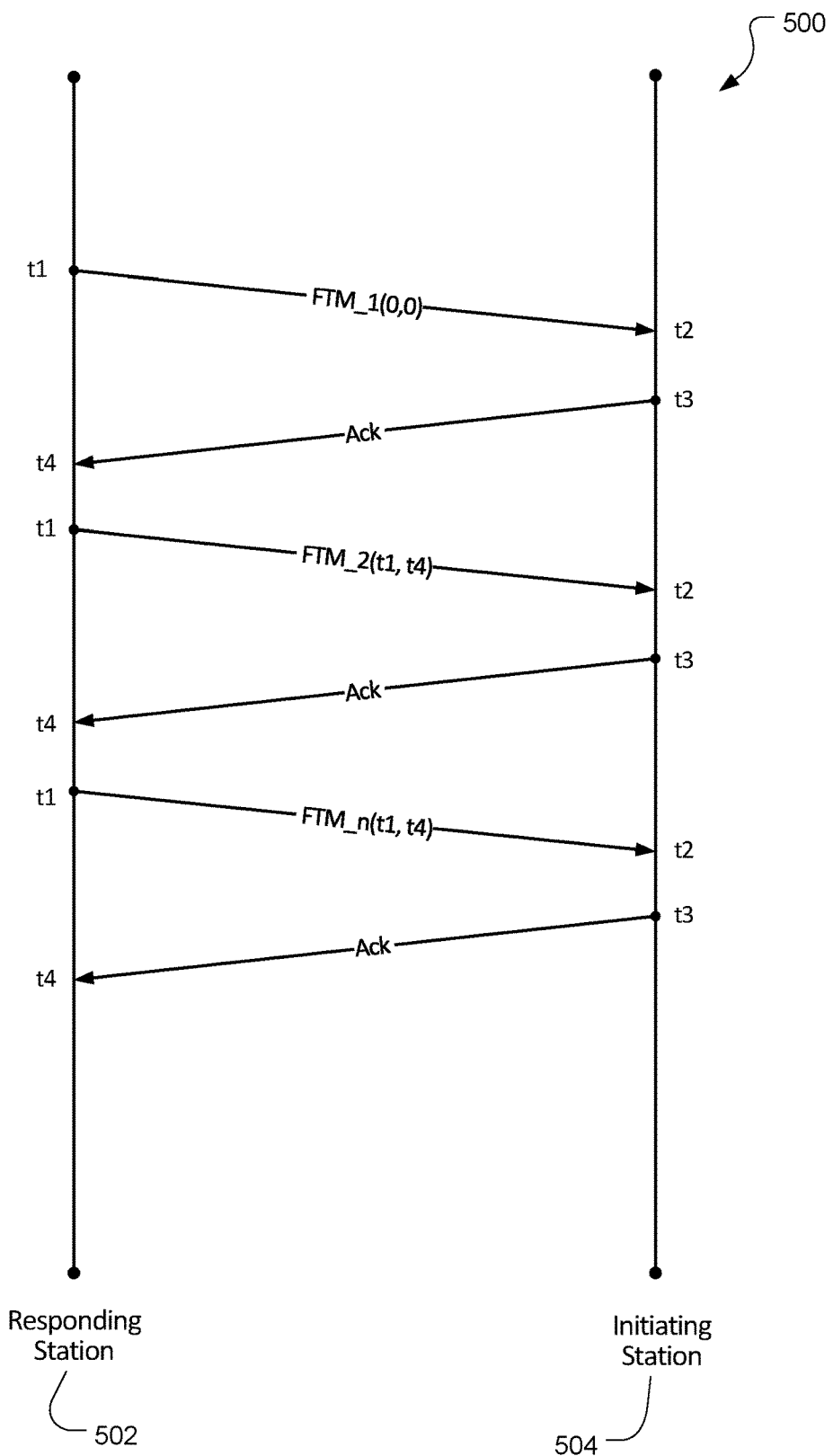
FIG. 5A is an example message flow for a round trip time measurement session.

Referring to FIG. 5A, an example of a diagram of a round trip time measurement session 500 is shown. The general approach includes a Responding station 502 and an Initiating station 504. The responding station 502 and the initiating station 504 may be a UE such as the UE 200, or other wireless mobile device configured to participate in time-of-flight based positioning. In an example, and not a limitation, the RTT measurement session 500 may be based on Fine Timing Measurement messages exchanged between the responding and initiating stations 502, 504. Other messages and signals such as positioning reference signals (PRS), sounding reference signals (SRS), Infra-Red camera signals, or other reference signals may be used to determine time-of-flight information between two UEs. The RTT session 500 may utilize a FTM Protocol (e.g., 802.11mc D4.3 section 10.24.6) to enable two stations to exchange round trip measurement frames (e.g., FTM frames). The initiating station 504 may compute the round trip time by recording the TOA (i.e., t2) of the FTM frame from the responding station 502 and recording the TOD of an acknowledgement frame (ACK) of the FTM frame (i.e., t3). The responding station 502 may record the TOD of the FTM frame (i.e., t1) and the TOA of the ACK received from initiating station 504 (i.e., t4). Variations of message formats may enable the timing values to be transferred between the responding and initiating stations 502, 504. The RTT is thus computed as:

$$RTT = [(t4-t1)-(t3-t2)] \quad (1)$$

The RTT session 500 may allow the initiating station 504 to obtain its range with the responding station 502. An FTM session is an example of a ranging technique between the responding station 502 and the initiating station 504. Other ranging techniques such as TDOA, TOA/TOF may also be used to determine the relative positions of the two stations. Other signaling may also be used to enable a negotiation process, the measurement exchange(s), and a termination process. For example, Wi-Fi 802.11az Ranging Null Data Packet (NDP) and Trigger-Based (TB) Ranging NDP sessions may also be used.

Figure 5B:
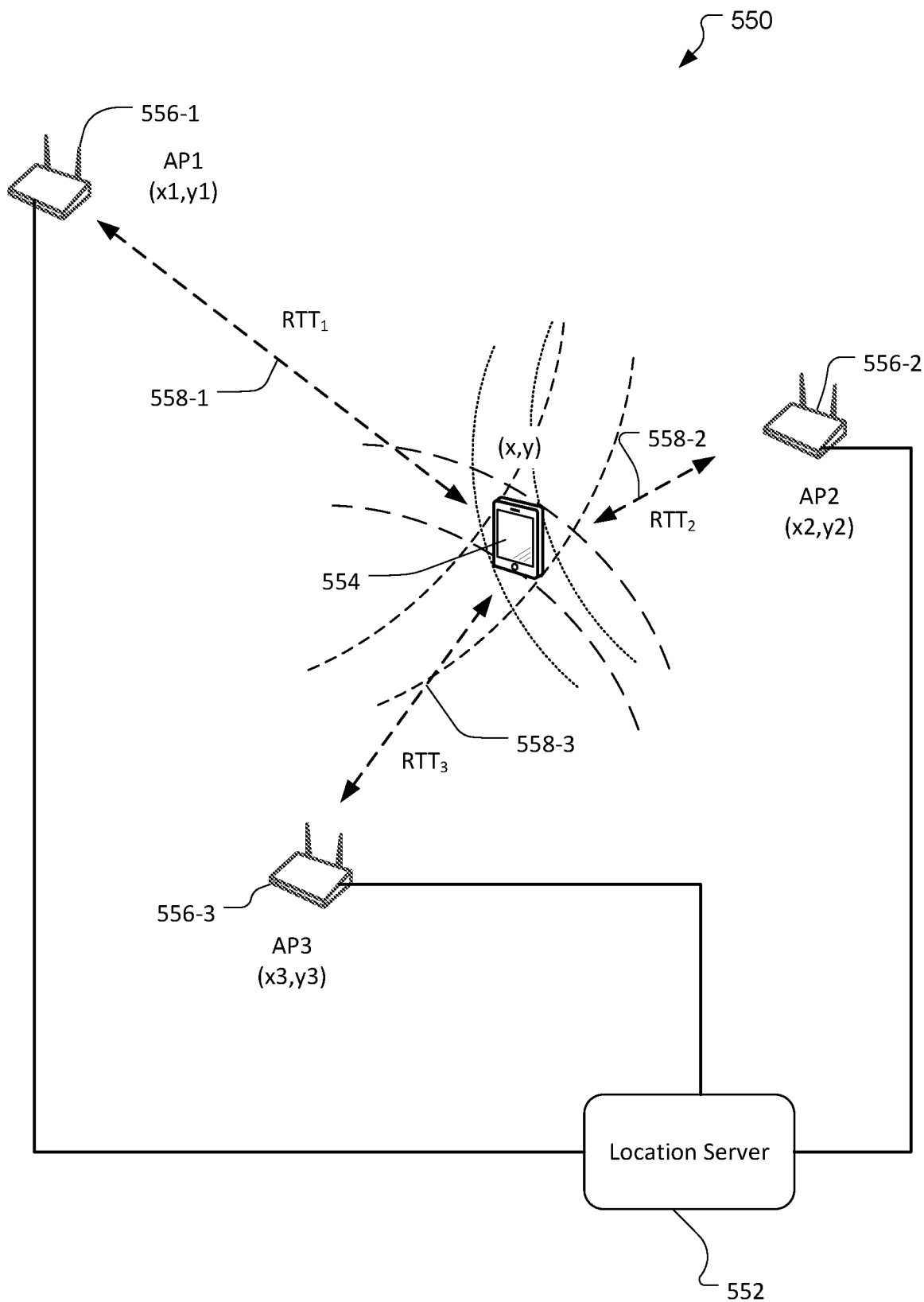
FIG. 5B is an example Wi-Fi wireless communication system.

Referring to FIG. 5B, an example Wi-Fi wireless communications network 550 according to aspects of the disclosure is shown. In the example of FIG. 5B, a location server 552 (which may correspond to any of the servers described herein) is configured to calculate a position estimate for a UE 554, or assist another entity (e.g., an AP, the UE 554, another UE, a location server, a third party application, etc.) to calculate a position estimate of the UE 554. The UE 554 may communicate wirelessly with a plurality of Wi-Fi access points 556-1, 556-2, and 556-3 (which may correspond to any of the TRPs 300 described herein) using RF signals and standardized protocols for the modulation of the RF signals and the exchange of information packets. By extracting different types of information from the exchanged RF signals, and utilizing the layout of the Wi-Fi wireless network 550 (i.e., the AP's locations, geometry, etc.), the location server 552 may determine a position of the UE 554, or assist in the determination of the position, in a predefined reference coordinate system. In an aspect, the location server 552 may specify the position using a two-dimensional coordinate system; however, the aspects disclosed herein are not so limited, and may also be applicable to determining positions using a three-dimensional coordinate system, if the extra dimension is desired. Additionally, while FIG. 5B illustrates one UE 554 and three AP 556-1, 556-2, 556-3, as will be appreciated, there may be more UEs 554 and more base stations.

To support position estimates, the APs 556-1, 556-2, 556-3 may be configured to broadcast reference RF signals to UEs in their coverage area to enable a UE 554 to measure characteristics of such reference RF signals. For example, the UE 554 may measure the ToA and/or RSSI of specific reference RF signals transmitted by at least three different APs and may use the RTT positioning method to report these ToAs (and additional information) back to the location server 552 (e.g., via a serving AP). In order to determine the position (x, y) of the UE 554, the entity determining the position of the UE 554 needs to know the locations of the APs 556-1, 556-2, 556-3, which may be represented in a reference coordinate system as $(x_k, y_k)$, where k=1, 2, 3 in the example of FIG. 5B. Where one of the APs 556-2 (e.g., the serving AP) or the UE 554 determines the position of the UE 554, the locations of the involved APs 556-1, 556-3 may be provided to the serving AP 556-2 or the UE 554 by the location server 552 (which has information of the network geometry). Alternatively, the location server 552 may determine the position of the UE 554 using the known network geometry.

Either the UE 554 or the respective APs 556-1, 556-2, 556-3 may determine the distance ($d_k$, where k=1, 2, 3) between the UE 554 and the respective APs 556-1, 556-2, 556-3. In an aspect, determining the RTT 558-1, 558-2, 558-3 of signals exchanged between the UE 554 and any AP 556-1, 556-2, 556-3 can be performed and converted to a distance ($d_k$). RTT techniques can measure the time between sending a signaling message (e.g., reference RF signals) and receiving a response. The FTM procedures in FIG. 5A are an example of a RTT technique. These methods may utilize calibration to remove any processing and hardware delays. In some environments, it may be assumed that the processing delays for the UE 554 and the APs 556-1, 556-2, 556-3 are the same.

Once each distance $d_k$ is determined, the UE 554, a AP 556-1, 556-2, 556-3, or the location server 552 can solve for the position (x, y) of the UE 554 by using a variety of known geometric techniques, such as, for example, trilateration. From FIG. 5B, it can be seen that the position of the UE 554 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 554 from the location of a AP 556-1, 556-2, 556-3). The intersection of the two directions at or near the point (x, y) can provide another estimate of the location for the UE 554. In an example, a single distance and AoA with one of the APs may be used to determine an estimated position of the UE 554.

Figure 6:
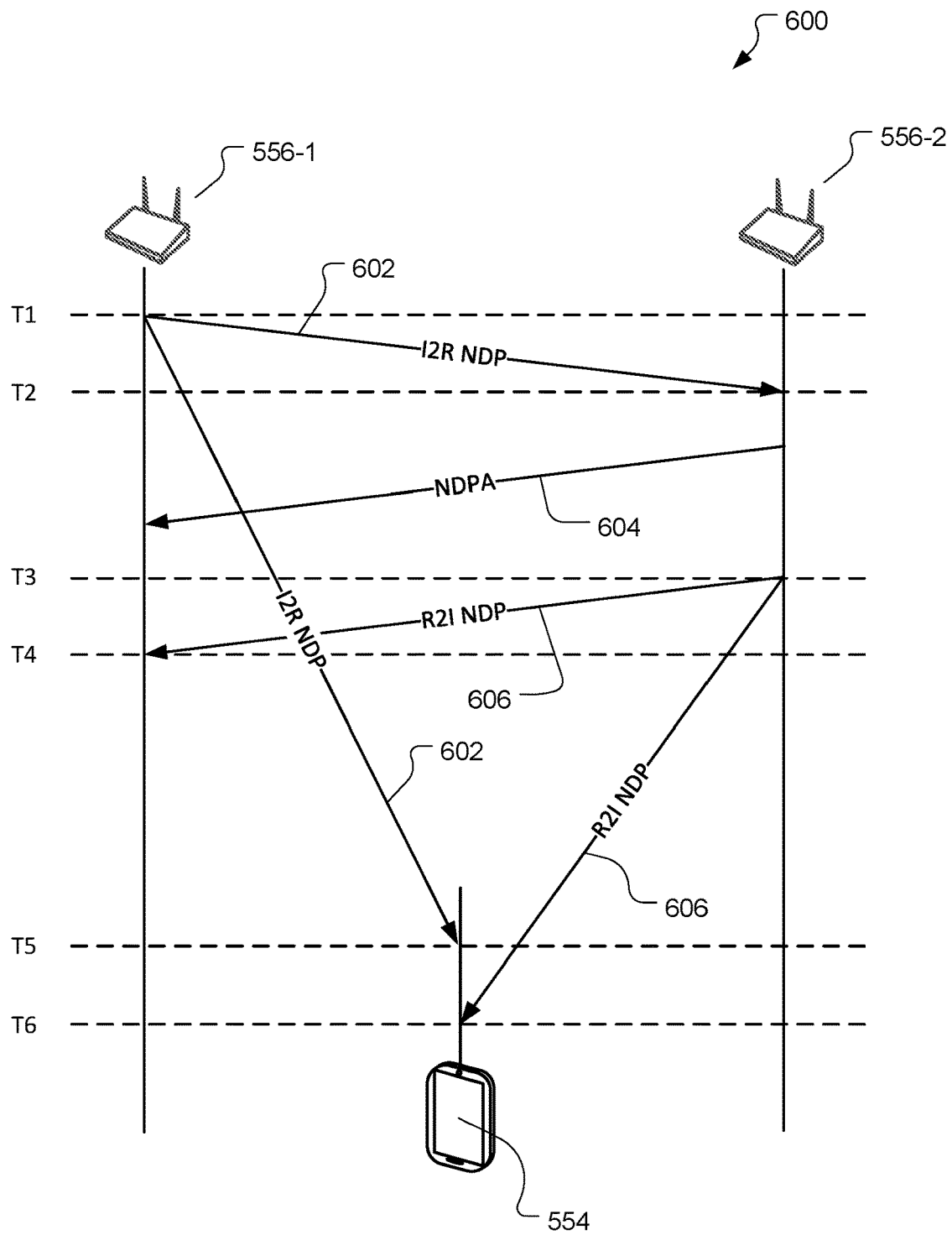
FIG. 6 is an example message flow for passive positioning with a user equipment.

Referring to FIG. 6, with further reference to FIG. 5B, an example message flow 600 for passive positioning with a plurality of APs is shown. The message flow 600 includes the first AP 556-1, the second AP 556-2, and the UE 554. In the message flow 600, the AP network 550 provides passive positioning service by exchanging NDP sounding packets between the APs, and client UEs listen to the packets. The location of the UEs may be estimated based on the received sounding packets. For example, the AP network 550 may utilize the passive positioning techniques described in 802.11az. In an example, the AP locations may be broadcast to the UEs. In a digital key application, the UE 554 may be configured to feedback a measurement information to a controller (not shown in FIG. 6). In an example, the message flow 600 includes transmitting a I2R NDP message 602 at time T1 with the first AP 556-1, which is received by the second AP 556-2 at time T2. The UE 554 is in a position to receive the I2R NDP 602 at time T5. The second AP 556-2 may send an acknowledgment message such as the NDPA message 604. The second AP 556-2 is configured to transmit an R2I NDP message 606 at time T3, which is received by the first AP 556-1 at time T4. The UE 554 is in a position to receive the R2I NDP 606 at time T6. The first AP 556-1 and/or the second AP 556-2 may be configured to indicate (e.g., via broadcasting or other signaling) the turnaround time (i.e., T3–T2), the time of flight (i.e., T2–T1), and other assistance data (e.g., locations of the APs 556-1, 556-2). In an example, the first AP 556-1 may indicate the time of flight, and the second AP 556-2 may indicate the turnaround time. In an embodiment, the UE 554 is configured to perform RSTD measurements based on the time of arrivals T5 and T6. In an embodiment, the UE 554 may be configured to store the respective ToAs (T5, T6) with station ID information (e.g., the MAC IDs of the respective first and second APs 556-1, 556-2) in a local data structure, and then provide the data to a digital key system controller.

Figure 7:
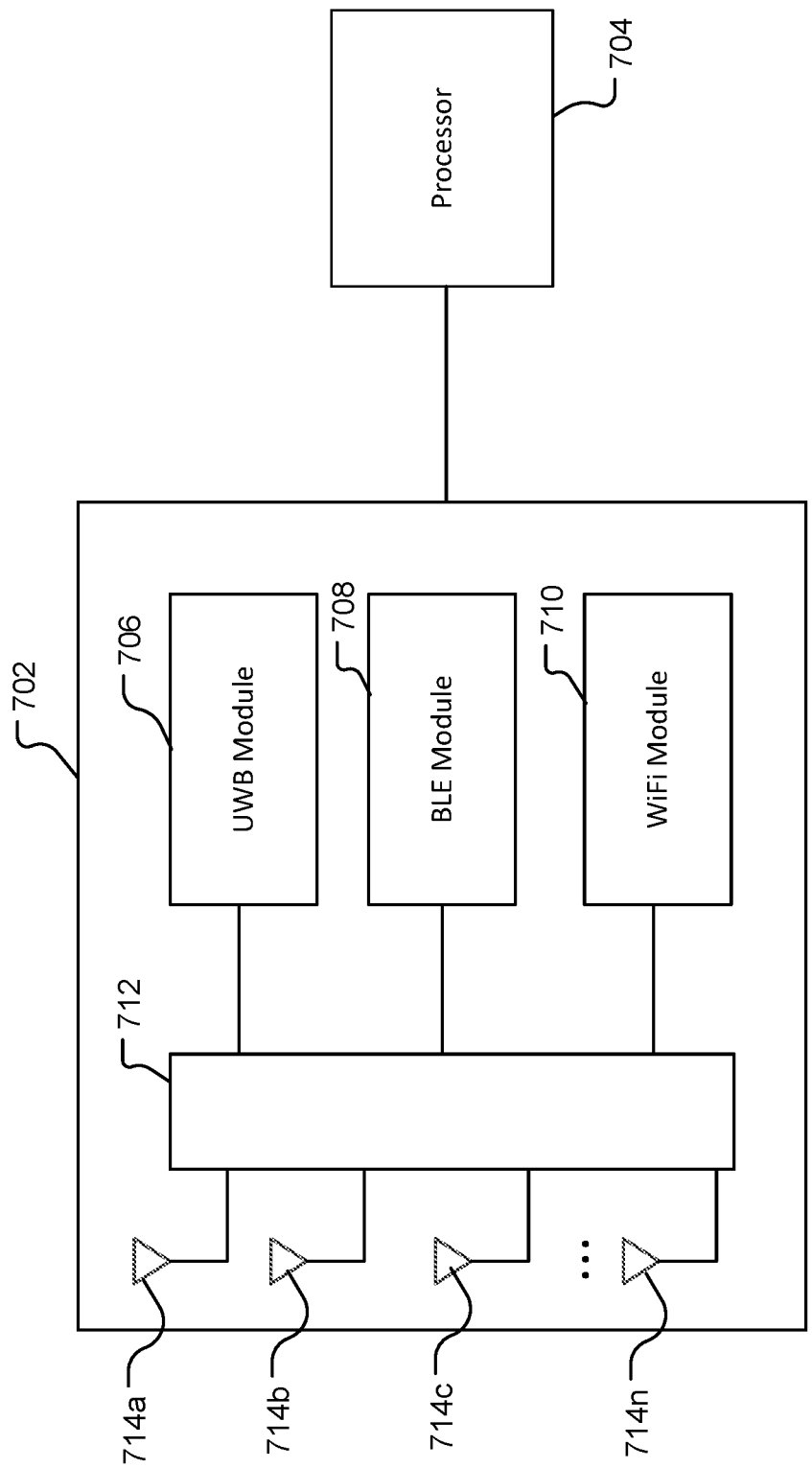
FIG. 7 is a block diagram of an example communications module with multiple transceivers.

Referring to FIG. 7, a block diagram of an example communications module 702 with multiple transceivers is shown. The communications module 702 may be used as a transceiver in a mobile device, such as the transceiver 215 in the UE 200, or a transceiver in a base station, such as the transceiver 315 in the TRP 300. For example, in a V2X network, the communication module may be included in a Roadside Unit (RSU). The communications module 702 may be communicatively coupled to a processor 704, such as the general-purpose processor 230 and/or the modem processor 232. One or more RF modules such as a UWB module 706, a BLE module 708, and a WiFi module 710 may be communicatively coupled to a plurality of antennas 714*a-n* via one or more multiplexers 712. The multiplexers 712 may include switches, phase shifters, and tuning circuits configured to enable one or more of the RF modules 706, 708, 710 to send and receive signals via one or more of the antennas 714*a-n*. For example, the WiFi module 710 and the UWB module 706 may be configured to utilize one or more of the antennas 714*a-n* based on operational frequencies. The phase shifters, and other components within the multiplexers 712, may enable beamforming to increase the transmit or receive gain on different boresight angles from the location of the antennas 714*a-n*.

Figure 8:
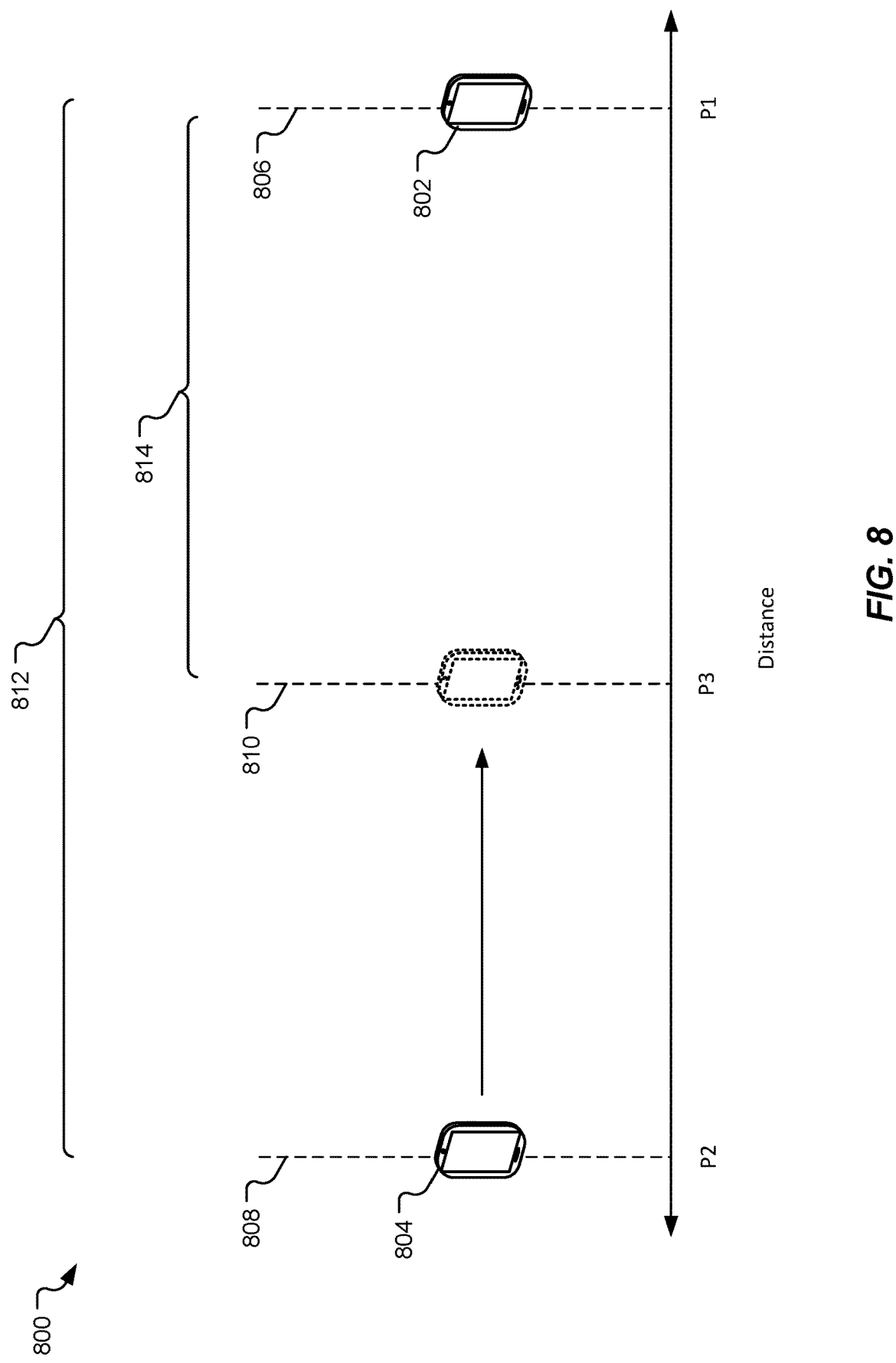
FIG. 8 is a diagram of an example process for sequential range determination.

Referring to FIG. 8, a diagram 800 of an example process for sequential range determination is shown. The diagram includes a first UE 802 and a second UE 804. The UEs 802, 804 may have some or all of the components of the UE 200, and the UE 200 may be an example of the UEs 802, 804. In an example use case, the first UE 802 may be a component wireless security system, such as a vehicle anti-theft system, and the second UE 804 may be a smart phone or a wireless key fob. The first UE 802 is located at a first position 806 and the second UE 804 is located at a second position 808, which is a first distance 812 from the first UE 802. In an example, the UEs 802, 804, may be configured to utilize a first RF technology, such as WiFi and/or BLE, to exchange ranging messages such as described in FIGS. 5A and 5B over the first distance 812. In an example, the first distance 812 may be approximately 100 m to 500 m, or greater.

In general, UWB utilizes a wide spectrum (500 MHz to several GHz) and high frequency (e.g., 6.5 GHz and 9 GHz) to enable low-power short range positioning. UWB positioning may be configured to measure distances on the order of 10 centimeters at a range of approximately 200 meters. While UWB provides higher positioning resolution, the effective range of UWB positioning is less than other positioning technologies such as WiFi and BLE. The second UE 804 may move closer to the first UE 802 (e.g., a driver with a key fob approaches a parked vehicle, an employee approaches a secure door, etc.) and close to a second distance 814 at a third position 810. The second distance 814 may be the effective range of UWB positioning (e.g., 200 m or less) and the UEs 802, 804 may be configured to exchange UWB ranging messages based on determining the second distance 814 with another RF technology (e.g., WiFi, BLE). In an embodiment the UEs 802, 804 may halt or reduce the periodicity of WiFi or BLE ranging when the UEs are within the second distance 814 of one another. The second distance 814 may be a previously established threshold distance (e.g., stored in memory 211), or may be based on evaluation of the channel state between the UEs 802, 804. For example, the presence of interference or other obstructions may cause a reduction in the second distance 814 and thus delay the activation of UWB based positioning until the UEs 802, 804 are closer to one another.

Figure 9A:
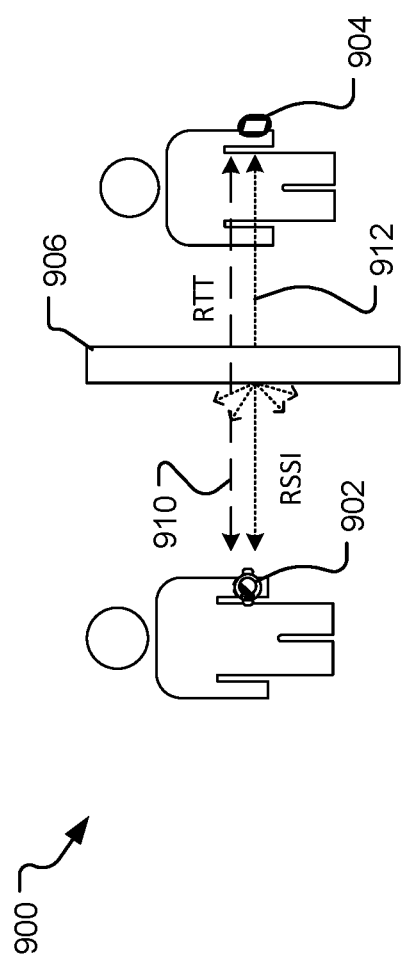
FIGS. 9A-9C are diagrams of example techniques for detecting a non-line of sight condition.
Figure 9C:
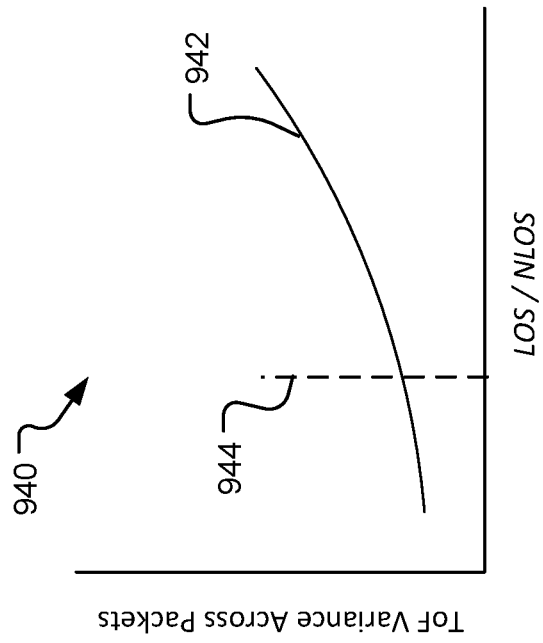
Figure 9B:
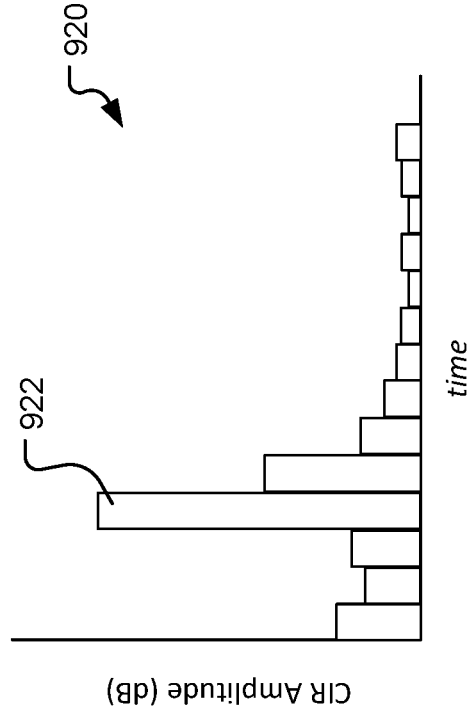

The accuracy of the UWB based positioning may be degraded if there are obstructions between the UEs 802, 804 and the measurements are based on NLOS signals. The obstructions may attenuate and/or reflect the UWB signals exchanged between the UEs. The UEs 802, 804 may be configured to utilize different techniques to detect a NLOS condition between two stations. Referring to FIGS. 9A-9C, example techniques for detecting NLOS conditions are shown. FIG. 9A depicts a first NLOS detection technique 900 including a first UE 902 and a second UE 904 exchanging messages through a barrier 906. The barrier 906 may be a structure such as a wall, vehicle, or other object which may attenuate a RF signal. In an example, the barrier 906 may be a user or other persons located between the UEs. 902, 904. The UEs 902, 904 may be configured to compute a first range based on RTT signals 910, and a second range based on a signal strength (e.g., RSSI) 912. Since the signals may be attenuated by the barrier 906, the second range 912 (based on RSSI) may indicate a larger distance than the first range (based on RTT). The difference in the RTT based range and the RSSI based range may be used to detect a NLOS condition. As an example, and not a limitation, a difference range of 1 meter or greater may be used to detect a NLOS condition.

Referring to FIG. 9B, a second NLOS detection technique 920 may be based on determining Channel State Information (CSI), such as the Channel Frequency Response (CFR) and/or the corresponding Channel Impulse Response (CIR). For example, a delayed CIR peak 922 which is later in time than the initial signal detection is an indication of a NLOS path (e.g., the LOS is the first arrival path). The delayed CIR peak 922 may indicate that the LOS path is obstructed since the signals associated with a NLOS path (e.g., a later arriving path) are stronger. Other channel state techniques as known in the art may be used to detect a NLOS condition.

Referring to FIG. 9C, a third NLOS detection technique 940 may be based on the variance of the time-of-flight (ToF)

packets received by a UE. An example variance curve 942 may indicate that the packets are received via a LOS or NLOS path. For example, a threshold variance value 944 may be established to detect a NLOS condition. As an example, and not a limitation, the threshold variance value 944 may be in the range of 0.5 to 2.0 nanoseconds. Other values may be used based on the positioning application and capabilities of the UEs.

Figure 9D:
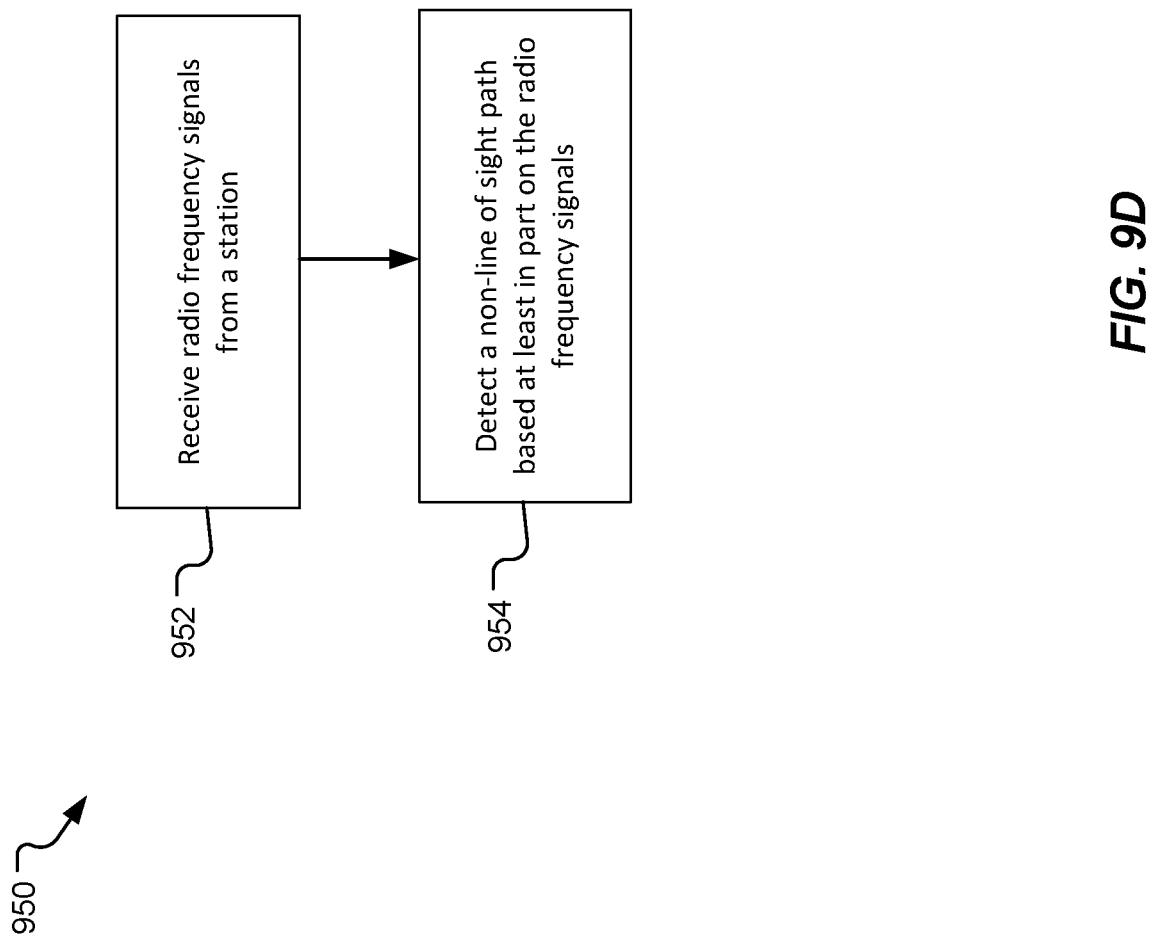
FIG. 9D is an example process flow for a method of detecting a non-line of sight condition.

Referring to FIG. 9D, with further reference to FIGS. 7, 8 and 9A-9C, a method 950 for detecting a NLOS path includes the stages shown. The method 950 is, however, an example and not limiting. The method 950 may be altered, e.g., by having stages added, removed, rearranged, combined, performed concurrently, and/or having single stages split into multiple stages.

At stage 952, the method includes receiving radio frequency signals from a station. A UE 200, including a communications module 702, is a means for receiving the RF signals. In an example, the first UE 802 may receive UWB positioning signals from the second UE 804 as part of an RTT exchange when the UEs 802, 804 are within the second distance 814 of one another. In a vehicle security use case, the first UE 802 may be a controller within a vehicle and configured to enable access to the vehicle when a user (e.g., the second UE 804) is within an allowed range (e.g., within 3 feet of the vehicle). The RF signals may be associated with other positioning use cases.

At stage 954, the method includes detecting a non-line of sigh path based at least in part on the radio frequency signals. The UE 200, including the communications module 702 and the processor 704, are a means for detecting the NLOS path. Continuing the example from stage 952, the first UE 802 may be configured to utilize one or more of the NLOS techniques 900, 920, 940 described in FIGS. 9A-9C to detect the NLOS path. For example, the first UE 802 may evaluate RTT and RSSI ranges, channel state information, and/or the variance of the ToF of packets transmitted by the second UE 804. Other NLOS detection techniques may also be used.

Figure 10A:
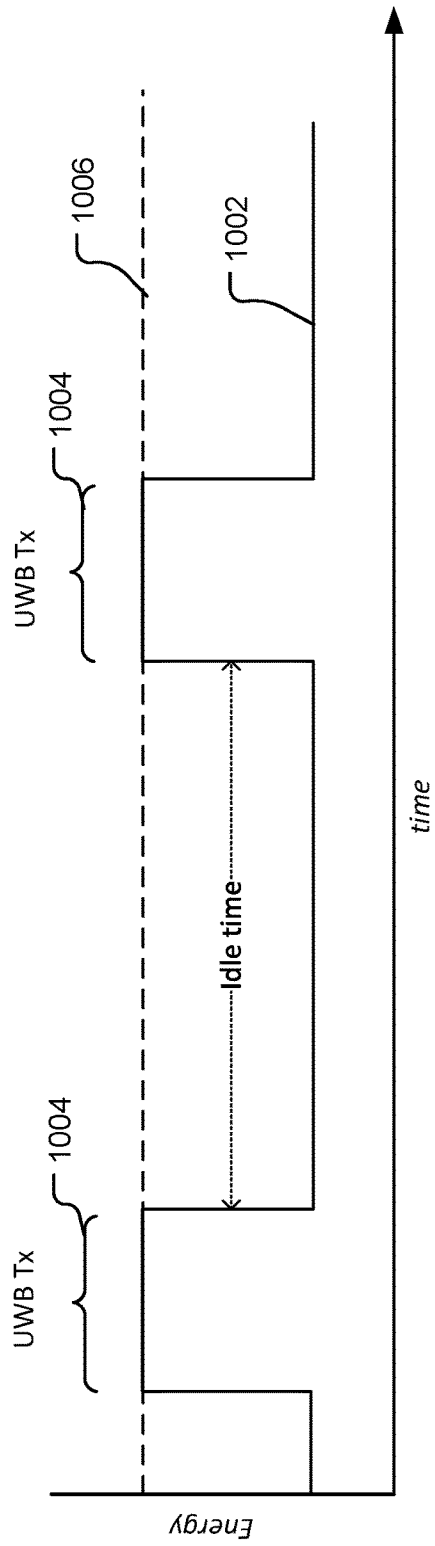
FIGS. 10A and 10B are example transmit power profiles for an ultrawideband (UWB) signal.
Figure 10B:
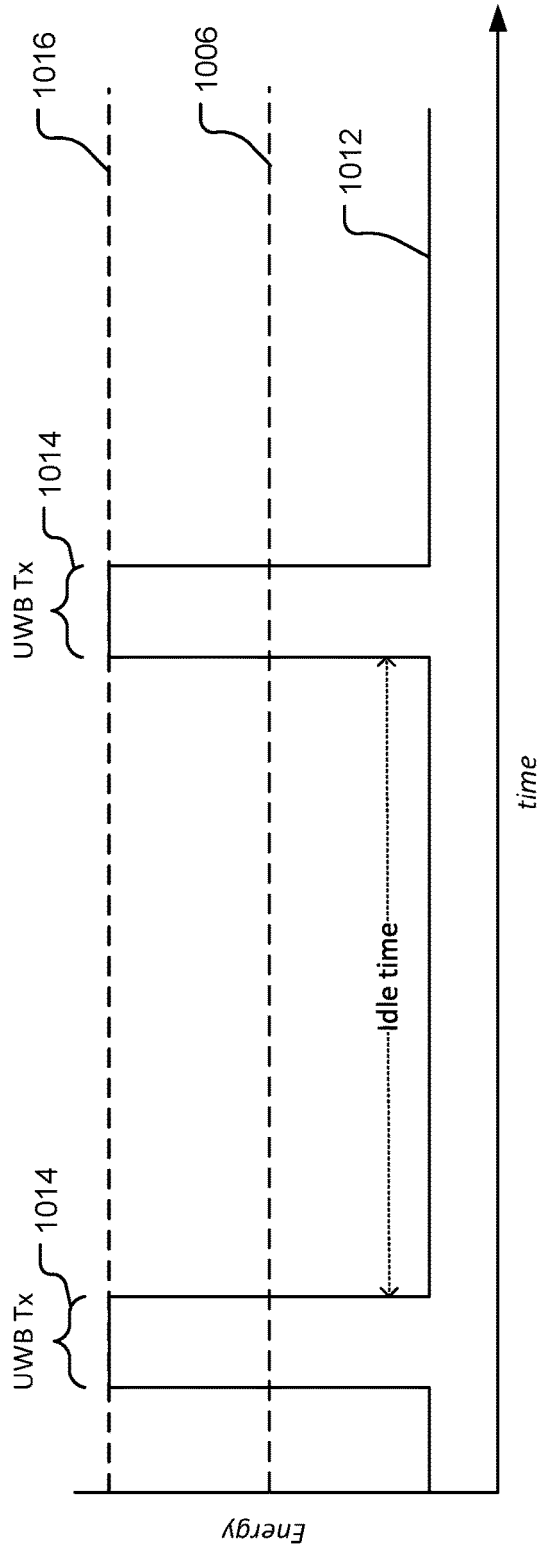

Referring to FIGS. 10A and 10B, example transmit power profiles for a UWB signal are shown. A first transmit profile 1002 may represent normal operations including transmitting packets of a first duration 1004 at a first power value 1006. The power transmitted from a UWB system may be regulated by local rules. For example, the Federal Communication Commission (FCC) has established limits for the average transmit power and the peak transmit power for UWB devices (e.g., 47 CFR sec. 15.519). The first transmit profile 1002 may be configured such that the first power value 1006 is below the peak transmit power limit, as well as being below the average transmit power limit based on the first duration 1004. In operation, a UWB device such as the communications module 702, may be configured to modify transmitter parameters to adjust the transmit profile. Referring to FIG. 10B, a second transmit profile 1012 may represent high power operations including transmitting packets of a second duration 1014 at a second power value 1016. The second duration 1014 is shorter than the first duration 1004, and the second power value 1016 is greater than the first power value 1006. The second transmit profile 1012 may be configured such that the second power value 1016 is below the peak transmit power limit as well as being below the average transmit power limit based on the second duration 1014. That is, during high power operations, the UWB transmitter may be configured to increase output power and transmit for shorter durations to ensure compliance with established peak and average power limits. The high powered operations may be used to improve ranging accuracy in NLOS use cases.

Figure 11:
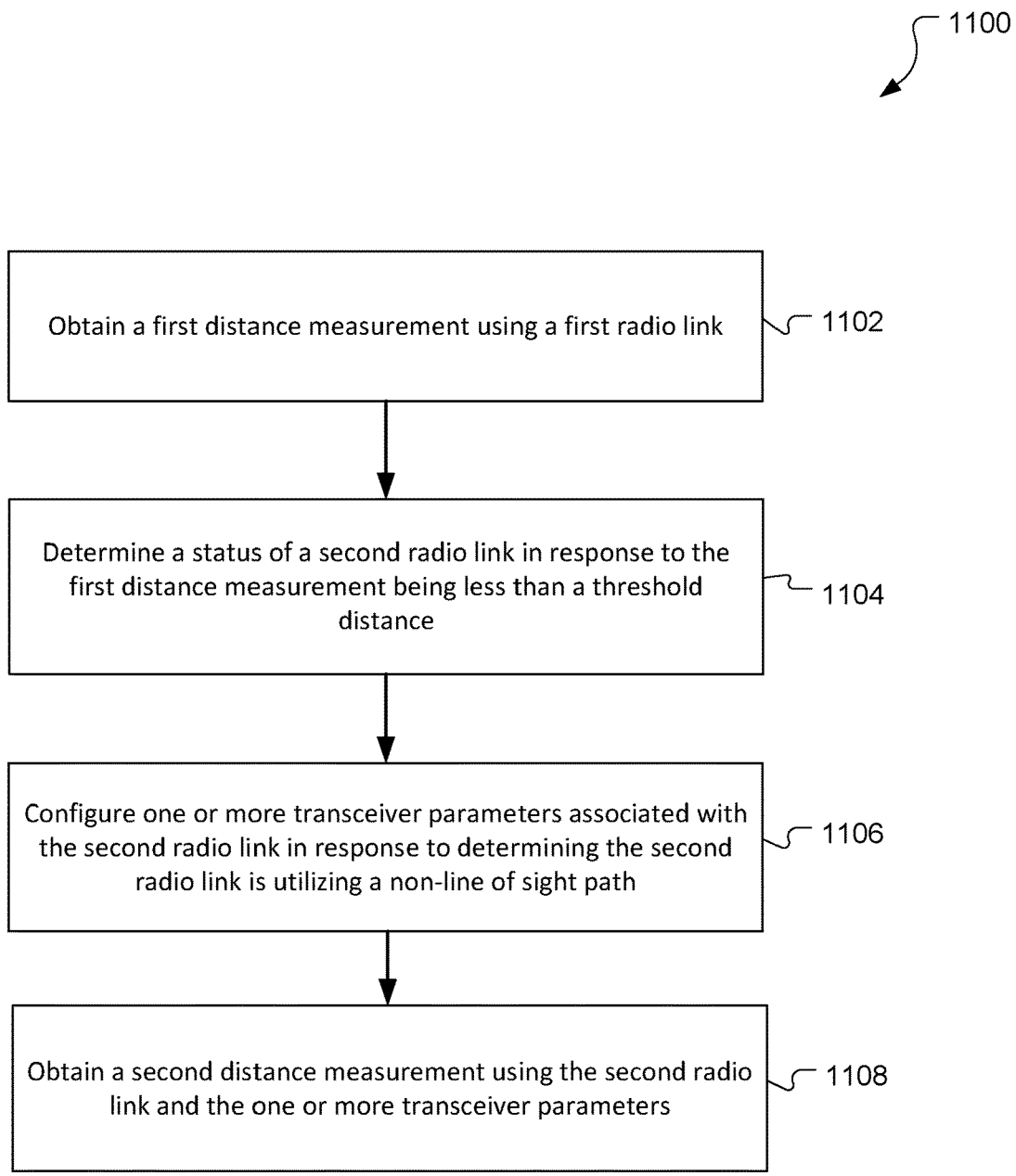
FIG. 11 is a process flow for a method for obtaining a distance measurement with a wireless node.

Referring to FIG. 11, with further reference to FIGS. 1-10B, a method 1100 for obtaining a distance measurement with a wireless node includes the stages shown. The method 1100 is, however, an example and not limiting. The method 1100 may be altered, e.g., by having stages added, removed, rearranged, combined, performed concurrently, and/or having single stages split into multiple stages.

At stage 1102, the method includes obtaining a first distance measurement using a first radio link. A UE 200, including a communications module 702 and a processor 704, may be a means for obtaining the first distance measurement. A wireless node may be a UE or other wireless controller configured to obtain UWB based range measurements. In vehicle security use cases, the wireless node may be a digital key fob or a controller on board a vehicle configured to detect a range to a user (e.g., the user's key fob or smartphone). In an example, referring to FIG. 8, the first UE 802 and the second UE 804 may be configured to exchange positioning measurements to determine the first distance measurement. The positioning measurements may be based on the first radio link such as WiFi or BLE. The positioning measurements may be based on RTT procedures such as depicted in FIG. 5A, or other positioning procedures such as RSSI (e.g., BLE positioning).

At stage 1104, the method includes determining a status of a second radio link in response to the first distance measurement being less than a threshold distance. The UE 200, including the communications module 702 and the processor 704, may be a means for determining the status of the second radio link. In an example, the threshold distance may correspond to the effective range of UWB based positioning (e.g., 100-200 m), and determining the status of the second radio link may include attempting to connect to a station with the second radio link. In an embodiment, determining the status of the second radio link may include obtaining one or more range measurements with the second radio link and determining if the resulting range measurements are within an expected accuracy requirement (e.g., 50, 20, 10 cm or less). Referring to FIG. 8, the first UE 802 may be configured to determine that the second UE 804 is within the second distance 814 based on WiFi and/or BLE measurements (e.g., the first radio link), and then switch to UWB and determine the status of the UWB connection and/or the accuracy of the UWB based range measurements.

At stage 1106, the method includes configuring one or more transceiver parameters associated with the second radio link in response to determining the second radio link is utilizing a non-line of sight path. The UE 200, including the communications module 702 and the processor 704, may be a means for configuring the one or more transceiver parameters. In an example, the processor 704 may be configured to detect a NLOS path based at least in part on UWB signals received on the second radio link. Referring to FIGS. 9A-9D, for example, determining that the second radio link is being received via a NLOS path may be detected based on one or more techniques such as using ToF to measure distance and determine short range and using RSSI to determine LOS/NLOS (e.g., FIG. 9A), or using ToF to determine short range and using CSI to determine LOS/NLOS (e.g., FIG. 9B), or using ToF to determine short range and using ToF variations across packets (standard deviation for example) to determine LOS/NLOS, (e.g. FIG. 9C). Other methods may also be used to determine that the second radio link is utilizing a NLOS path.

In response to determining the second radio link is utilizing a NLOS path, the processor 704 may configure or reconfigure one or more transceiver parameters such as including transmit power, packet length, idle time and a number of receive antennas to improve UWB ranging accuracy while also meeting potential regulatory requirements for UWB transmit power. In an example, the communications module 702 may have transmit power headroom available and the processor 704 may be configured to increase the transmit power based on the available headroom. In another example, referring to FIGS. 10A and 10B, the transmit power may be increased from the first power value 1006 to the second power value 1016 and the packet lengths may be reduced from the first duration 1004 to the second duration 1014. In an example, the UWB module 706 may share one or more antennas 714a-n with the WiFi module 710 since they may be configured to operate in the same frequency band. In an effort to conserve battery power, UWB ranging operations may be triggered by determining the first distance based on ranging operations with the BLE module 708. That is, UWB ranging takes place when BLE indicates a close range.

At stage 1108, the method includes obtaining a second distance measurement using the second radio link and the one or more transceiver parameters. The UE 200, including the communications module 702 and the processor 704, may be a means for obtaining the second distance measurement. In general, when the UE 200 detects that it is within a short range (e.g., within the first distance) at stage 1102, and determines that the second radio link is utilizing a NLOS path, the UE 200 is configured to adjust one or more transceiver settings to increase the power of the second radio link to reduce the impact of the NLOS path. In an example, the processor 704 may be configure to coordinate the UWB module 706, the BLE module 708, the WiFi module 710 and the multiplexer 712 to jointly optimize ranging performance. For example, when BLE ranging indicates a close range (e.g., the first distance measurement at stage 1102), but the UWB module 706 has not established a connection (e.g., due to NLOS path), the processor 704 may be configured to utilize the WiFi module 710 to measure a few metrics such as ToF, RSSI and CSI using WiFi protocols since Wi-Fi may utilize higher transmit power and has a larger coverage area (e.g., larger range). The processor 704 may utilize the WiFi measurements to determine metrics, that the UWB module 706 is using a NLOS path and then configure the one or more transceiver parameters to improve the UWB ranging accuracy. For example, the second distance measurement is obtained using an increase in transmit power, modifying the transmit power profile, or modifying the receiver antenna configuration. Other techniques may also be used to increase the signal output from the UWB module 706.

In an example, the first radio link may be a BLE based technology and/or a WiFi based technology, and the second radio link may be a UWB technology. The threshold distance may be 100 meters or less. In an implementation, the threshold distance may be 20 meters. Determining the second radio link is utilizing the non-line of sight path may include receiving a plurality of radio frequency signals on the first radio link or the second radio link, and detecting the non-line of sight path based on the plurality of radio frequency signals. The method 1100 may further include determining a first range value based on a round trip time associated with the plurality of radio frequency signals, determining a second range value based on a received signal strength indication associated with the plurality of radio frequency signals, and detecting the non-line of sight path based at least in part on a comparison of the first range value and the second range value. Determining a channel state indication may be based on the plurality of radio frequency signals, and detecting the non-line of sight path may be based at least in part on the channel state indication. A time-of-flight variance value associated with the plurality of radio frequency signals may be determined, and detecting the non-line of sight path may be based at least in part on the time-of-flight variance value. The method 1100 may further include comparing a plurality of signal measurement values obtained via the second radio link to a key performance indicator value, and configuring the one or more transceiver parameters based at least in part on a difference between the plurality of signal measurement values and the key performance indicator value. The wireless node may be a user equipment, a digital key fob, and/or a controller in a vehicle.

Figure 12:
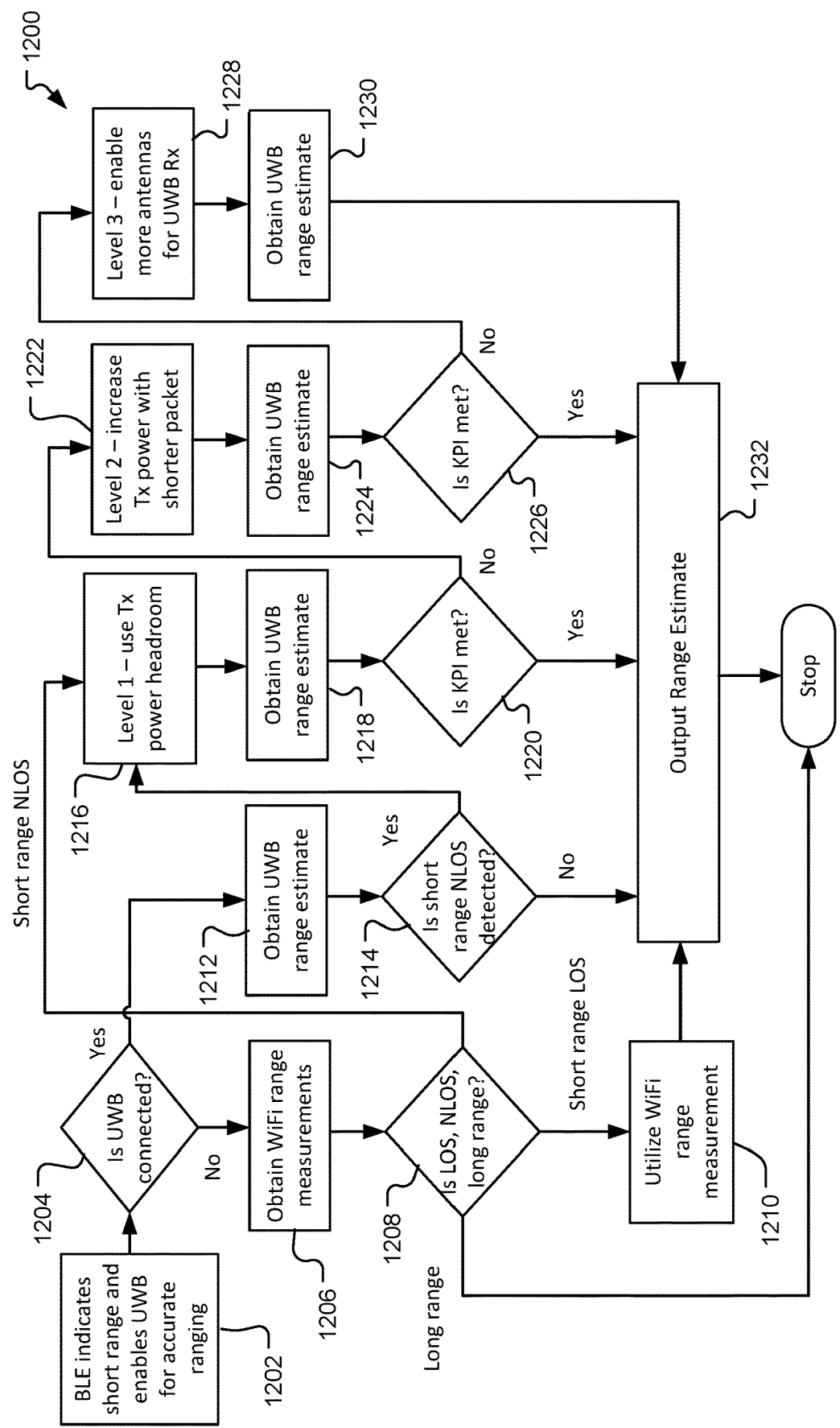
FIG. 12 is a process flow for a method for obtaining a range estimate with a ultrawideband (UWB) device.

Referring to FIG. 12, with further reference to FIGS. 1-11, a method 1200 for obtaining a range estimate with an ultrawideband (UWB) device includes the stages shown. The method 1200 is, however, an example and not limiting. The method 1200 may be altered, e.g., by having stages added, removed, rearranged, combined, performed concurrently, and/or having single stages split into multiple stages. A UE 200, including a communications module 702, is a means for implementing the method 1200.

At stage 1202, the method includes enabling UWB transmissions based on an indication of a short range from BLE transmissions. The distance of a short range may be based on the expected range of a UWB measurement technique (e.g., 200 m or less). For example, the short range may correspond to the second distance 814 when the first UE 802 and the second UE 804 are within the expected range of the UWB measurement technique. At stage 1204, the method includes determining if the devices have established a UWB connection. In an example, two UEs may not establish a UWB connection due to various environmental factors such as local interference and the presence of obstructions such as walls, crowds, vehicles, or other objects which may create a NLOS condition. The relative locations of the UEs may also create a NLOS condition. For example, a key fob located in a user's backpack, pocket, or purse may be disposed such that the user is located between the key fob and the vehicle (i.e., the user's body is causing the NLOS condition). At stage 1206, the UE 200 may utilize another radio link, such as WiFi, if the UEs cannot establish a connection. The UEs may utilize WiFi to establish a connection and determine a range and determine whether the UEs are in a LOS or NLOS condition at stage 1208. For example, the UEs may utilize procedures such as the RTT/RSSI technique depicted in FIG. 9A to compute a range and determine whether there is a NLOS condition (e.g., the presence of a barrier 906). The CIR and ToF variance techniques may also be used with the WiFi signals. If the range computed based on the WiFi signals is greater than the expected UWB range (e.g., greater than 200 m), the method 1200 may end. In an example, the method 1200 may then iterate back to stage 1202. At stage 1210, a WiFi range based on LOS measurements may be output at stage 1232 as the range estimate. In this circumstance, since a UWB connection could not be established at stage 1204, the WiFi range determined at stage 1208 is the best range estimate.

Referring back to stage 1204, if a UWB connection is established then a UWB based range estimate may be obtained at stage 1212. The UWB based range may be based on RSSI, RTT or other ToF based methods. At stage 1214, the UE 200 may be configured to determine whether there is a NLOS condition impacting the UWB signals. For example, the techniques described in FIGS. 9A-9D may be used with UWB signals to detect a NLOS condition. If the range estimate determined at stage 1212 is based on LOS measurements (e.g., no NLOS condition is detected), then the range estimate is output at stage 1232. If a NLOS condition is determined at stage 1214, or at stage 1208, the method 1200 may adjust one or more transceiver parameters to increase the transmit and/or receive capabilities of the UWB module 706.

In an example, at stage 1216, the processor 704 may be configured to increase the transmit power of the UWB module 706 based on the available headroom. For example, the UWB module 706 may be configured to utilize 80% power in normal operations (e.g., at stages 1204, 1212) and then increase the power (e.g., to 90% or 100%) at stage 1216 in an effort to improve the UWB signal strength. The UE 200 may obtain another range estimate at stage 1218 based on the increased transmitter power setting and then evaluate the quality of the range estimated at stage 1220. The accuracy of a plurality of range measurements computed at stage 1218 may be compared to one another and evaluated against a key performance indicator (KPI) to determine the quality. For example, the KPI for a digital key use case may be measurement values with a variance of less than 20 cm. Other applications and use cases may have different KPI values. If the KPI value is achieved at stage 1220, then the range estimate determined at stage 1218 is output at stage 1232.

In an example, at stage 1222, the transmit profile of the UWB signals may be modified if the KPI requirements of stage 1220 are not met. In an example, referring to FIGS. 10A and 10B, the packet lengths may be decreased and the power per packet may be increased. For example, the packet length may be decreased to 150 micro seconds with 1-2 milliseconds of idle time. The UE 200 may obtain another range estimate at stage 1224 based on the increased transmit power and short packet configured at stage 1222, as well as the increased transmitter power setting established at stage 1216. The KPI of the UWB based range estimate is then evaluated at stage 1226. The range estimate determined at stage 1224 is output at stage 1232 if the KPI is satisfied.

In an example, at stage 1228, the processor 704 may be configured to enable more antennas 714a-n to increase the gain of the receiver in the UWB module 706. For example, adding an additional antenna (e.g., for a total of two antennas) may increase the sensitivity 3 dB, and adding two additional antennas (e.g., for a total of three antennas) may increase the sensitivity 5 dB. Other antenna combinations may further increase the receive sensitivity. In an embodiment, the UWB module 706 and the WiFi module 710 may be configured to share antennas and the processor 704 and the multiplexer 712 may be configured to adjust the antenna utilization. The UE 200 may obtain another range estimate at stage 1230 based on the receive antenna configuration implemented at stage 1228, as well as the increased transmit power and short packet configured at stage 1222, and the increased transmitter power setting established at stage 1216. The range estimate obtained at stage 1230 may be output at stage 1232.

While the method 1200 implements the transceiver parameters described at stages 1216, 1222, 1228 in a serial order, the transceiver parameters may be implemented individually in various other sequences and/or in parallel sequences. For example, the receive antenna parameters at stage 1228 may be implemented first, followed by the increase in transmit power and the decrease in packet length, followed by the increase in transmit power. Other sequences are also possible. In an example, two or more of the parameters may be modified simultaneously (e.g., increase transmit power based on headroom and shortening the packet length, etc.). Various sequential combinations of such parallel modifications may also be used.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the location server may be performed outside of the location such as by an AP.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for obtaining a distance measurement with a wireless node, comprising:
   obtaining a first distance measurement using a first radio link;
   determining a status of a second radio link in response to the first distance measurement being less than a threshold distance;
   configuring one or more transceiver parameters associated with the second radio link in response to determining the second radio link is utilizing a non-line of sight path; and
   obtaining a second distance measurement using the second radio link and the one or more transceiver parameters.

2. The method of clause 1 wherein the first radio link comprises a Bluetooth based technology.

3. The method of clause 1 wherein the first radio link comprises a WiFi based technology.

4. The method of clause 1 wherein the second radio link comprises a ultrawideband technology.

5. The method of clause 1 wherein the threshold distance is 100 meters or less.

6. The method of clause 1 wherein determining the second radio link is utilizing the non-line of sight path comprises:
   receiving a plurality of radio frequency signals on the first radio link or the second radio link; and
   detecting the non-line of sight path based on the plurality of radio frequency signals.

7. The method of clause 6 further comprising:
   determining a first range value based on a round trip time associated with the plurality of radio frequency signals;
   determining a second range value based on a received signal strength indication associated with the plurality of radio frequency signals; and
   detecting the non-line of sight path based at least in part on a comparison of the first range value and the second range value.

8. The method of clause 6 further comprising:
   determining a channel state indication based on at least one of the plurality of radio frequency signals; and
   detecting the non-line of sight path based at least in part on the channel state indication.

9. The method of clause 6 further comprising:
   determining a time-of-flight variance value associated with the plurality of radio frequency signals; and
   detecting the non-line of sight path based at least in part on the time-of-flight variance value.

10. The method of clause 1 further comprising:
    comparing one or more signal measurement values obtained via the second radio link to a key performance indicator value; and configuring the one or more transceiver parameters based at least in part on a difference between the one or more signal measurement values and the key performance indicator value.

11. The method of clause 1 wherein configuring the one or more transceiver parameters includes increasing a transmit output power.

12. The method of clause 1 wherein configuring the one or more transceiver parameters includes decreasing a transmit packet length.

13. The method of clause 1 wherein configuring the one or more transceiver parameters includes modifying a receiver antenna configuration.

14. The method of clause 1 wherein the wireless node is a user equipment.

15. The method of clause 14 wherein the user equipment is a digital key fob.

16. The method of clause 1 wherein the wireless node is a controller in a vehicle.

17. An apparatus, comprising:
a memory;
at least one transceiver;
at least one processor communicatively coupled to the memory and the at least one transceiver, and configured to:
obtain a first distance measurement using a first radio link;
determine a status of a second radio link in response to the first distance measurement being less than a threshold distance;
configure one or more transceiver parameters associated with the second radio link in response to determining the second radio link is utilizing a non-line of sight path; and
obtain a second distance measurement using the second radio link and the one or more transceiver parameters.

18. The apparatus of clause 17 wherein the at least one transceiver includes a Bluetooth module and the first radio link comprises a Bluetooth based technology.

19. The apparatus of clause 17 wherein the at least one transceiver includes a WiFi module and the first radio link comprises a WiFi based technology.

20. The apparatus of clause 17 wherein the at least one transceiver includes an ultrawideband module and the second radio link comprises a ultrawideband technology.

21. The apparatus of clause 17 wherein the threshold distance is 100 meters or less.

22. The apparatus of clause 17 wherein the at least one processor is further configured to:
receive a plurality of radio frequency signals on the first radio link or the second radio link; and
detect the non-line of sight path based on the plurality of radio frequency signals.

23. The apparatus of clause 22 wherein the at least one processor is further configured to:
determine a first range value based on a round trip time associated with the plurality of radio frequency signals;
determine a second range value based on a received signal strength indication associated with the plurality of radio frequency signals; and
detect the non-line of sight path based at least in part on a comparison of the first range value and the second range value.

24. The apparatus of clause 22 wherein the at least one processor is further configured to:
determine a channel state indication based on the plurality of radio frequency signals; and detect the non-line of sight path based at least in part on the channel state indication.

25. The apparatus of clause 22 where the at least one processor is further configured to:
determine a time-of-flight variance value associated with the plurality of radio frequency signals; and
detect the non-line of sight path based at least in part on the time-of-flight variance value.

26. The apparatus of clause 17 wherein the at least one processor is further configured to:
compare one or more signal measurement values obtained via the second radio link to a key performance indicator value; and
configure the one or more transceiver parameters based at least in part on a difference between the one or more signal measurement values and the key performance indicator value.

27. The apparatus of clause 17 wherein the at least one processor is further configured to increase a transmit power to configure the one or more transceiver parameters.

28. The apparatus of clause 17 wherein the at least one processor is further configured to decrease a transmit packet length to configure the one or more transceiver parameters.

29. The apparatus of clause 17 wherein the at least one processor is further configured to modify a receiver antenna configuration to configure the one or more transceiver parameters.

30. An apparatus for obtaining a distance measurement with a wireless node, comprising:
means for obtaining a first distance measurement using a first radio link;
means for determining a status of a second radio link in response to the first distance measurement being less than a threshold distance;
means for configuring one or more transceiver parameters associated with the second radio link in response to determining the second radio link is utilizing a non-line of sight path; and
means for obtaining a second distance measurement using the second radio link and the one or more transceiver parameters.

31. A non-transitory processor-readable storage medium comprising processor-readable instructions configured to cause one or more processors to obtain a distance measurement with a wireless node, comprising:
code for obtaining a first distance measurement using a first radio link;
code for determining a status of a second radio link in response to the first distance measurement being less than a threshold distance;
code for configuring one or more transceiver parameters associated with the second radio link in response to determining the second radio link is utilizing a non-line of sight path; and
code for obtaining a second distance measurement using the second radio link and the one or more transceiver parameters.

The invention claimed is:
1. A method for obtaining a distance measurement with a wireless node, comprising:
obtaining a first distance measurement using a first radio link;
determining a status of a second radio link in response to the first distance measurement being less than a threshold distance;

configuring one or more transceiver parameters associated with the second radio link in response to determining the second radio link is utilizing a non-line of sight path; and obtaining a second distance measurement using the second radio link and the one or more transceiver parameters;

wherein determining the second radio link is utilizing the non-line of sight path comprises:

receiving a plurality of radio frequency signals on the first radio link or the second radio link;

determining a first range value based on a round trip time associated with the plurality of radio frequency signals;

determining a second range value based on a received signal strength indication associated with the plurality of radio frequency signals; and detecting the non-line of sight path based at least in part on a comparison of the first range value and the second range value.

2. The method of claim 1 wherein the first radio link comprises a Bluetooth based technology.

3. The method of claim 1 wherein the first radio link comprises a WiFi based technology.

4. The method of claim 1 wherein the second radio link comprises a ultrawideband technology.

5. The method of claim 1 wherein the threshold distance is 100 meters or less.

6. The method of claim 1, wherein determining the second radio link is utilizing the non-line of sight path further comprises determining a channel state indication based on at least one of the plurality of radio frequency signals.

7. The method of claim 1, wherein determining the second radio link is utilizing the non-line of sight path further comprises determining a time-of-flight variance value associated with the plurality of radio frequency signals.

8. The method of claim 1 further comprising:

comparing one or more signal measurement values obtained via the second radio link to a key performance indicator value; and configuring the one or more transceiver parameters based at least in part on a difference between the one or more signal measurement values and the key performance indicator value.

9. The method of claim 1 wherein configuring the one or more transceiver parameters includes increasing a transmit output power.

10. The method of claim 1 wherein configuring the one or more transceiver parameters includes decreasing a transmit packet length.

11. The method of claim 1 wherein configuring the one or more transceiver parameters includes modifying a receiver antenna configuration.

12. The method of claim 1 wherein the wireless node is a user equipment.

13. The method of claim 12 wherein the user equipment is a digital key fob.

14. The method of claim 1 wherein the wireless node is a controller in a vehicle.

15. An apparatus, comprising:

a memory;

at least one transceiver;

at least one processor communicatively coupled to the memory and the at least one transceiver, and configured to:

obtain a first distance measurement using a first radio link;

determine a status of a second radio link in response to the first distance measurement being less than a threshold distance;

configure one or more transceiver parameters associated with the second radio link in response to determining the second radio link is utilizing a non-line of sight path; and obtain a second distance measurement using the second radio link and the one or more transceiver parameters;

wherein to determine the second radio link is utilizing the non-line of sight path, the at least one processor is configured to:

receive a plurality of radio frequency signals on the first radio link or the second radio link;

determine a first range value based on a round trip time associated with the plurality of radio frequency signals;

determine a second range value based on a received signal strength indication associated with the plurality of radio frequency signals; and detect the non-line of sight path based at least in part on a comparison of the first range value and the second range value.

16. The apparatus of claim 15 wherein the at least one transceiver includes a Bluetooth module and the first radio link comprises a Bluetooth based technology.

17. The apparatus of claim 15 wherein the at least one transceiver includes a WiFi module and the first radio link comprises a WiFi based technology.

18. The apparatus of claim 15 wherein the at least one transceiver includes an ultrawideband module and the second radio link comprises a ultrawideband technology.

19. The apparatus of claim 15 wherein the threshold distance is 100 meters or less.

20. The apparatus of claim 15 wherein the at least one processor is further configured to:

determine a channel state indication based on the plurality of radio frequency signals to determine the second radio link is utilizing the non-line of sight path.

21. The apparatus of claim 15 where the at least one processor is further configured to:

determine a time-of-flight variance value associated with the plurality of radio frequency signals to determine the second radio link is utilizing the non-line of sight path.

22. The apparatus of claim 15 wherein the at least one processor is further configured to:

compare one or more signal measurement values obtained via the second radio link to a key performance indicator value; and configure the one or more transceiver parameters based at least in part on a difference between the one or more signal measurement values and the key performance indicator value.

23. The apparatus of claim 15 wherein the at least one processor is further configured to increase a transmit power to configure the one or more transceiver parameters.

24. The apparatus of claim 15 wherein the at least one processor is further configured to decrease a transmit packet length to configure the one or more transceiver parameters.

25. The apparatus of claim 15 wherein the at least one processor is further configured to modify a receiver antenna configuration to configure the one or more transceiver parameters.

26. An apparatus for obtaining a distance measurement with a wireless node, comprising:
- means for obtaining a first distance measurement using a first radio link;
- means for determining a status of a second radio link in response to the first distance measurement being less than a threshold distance;
- means for configuring one or more transceiver parameters associated with the second radio link in response to determining the second radio link is utilizing a non-line of sight path; and
- means for obtaining a second distance measurement using the second radio link and the one or more transceiver parameters;
- wherein determining the second radio link is utilizing the non-line of sight path comprises:
- means for receiving a plurality of radio frequency signals on the first radio link or the second radio link;
- means for determining a first range value based on a round trip time associated with the plurality of radio frequency signals;
- means for determining a second range value based on a received signal strength indication associated with the plurality of radio frequency signals; and
- means for detecting the non-line of sight path based at least in part on a comparison of the first range value and the second range value.

27. A non-transitory processor-readable storage medium comprising processor-readable instructions configured to cause one or more processors to obtain a distance measurement with a wireless node, comprising:
- code for obtaining a first distance measurement using a first radio link;
- code for determining a status of a second radio link in response to the first distance measurement being less than a threshold distance;
- code for configuring one or more transceiver parameters associated with the second radio link in response to determining the second radio link is utilizing a non-line of sight path; and
- code for obtaining a second distance measurement using the second radio link and the one or more transceiver parameters;
- wherein code for determining the second radio link is utilizing the non-line of sight path comprises:
- code for receiving a plurality of radio frequency signals on the first radio link or the second radio link;
- code for determining a first range value based on a round trip time associated with the plurality of radio frequency signals;
- code for determining a second range value based on a received signal strength indication associated with the plurality of radio frequency signals; and
- code for detecting the non-line of sight path based at least in part on a comparison of the first range value and the second range value.

\* \* \* \* \*